United States Patent
Bozdagi

(10) Patent No.: US 6,768,518 B1
(45) Date of Patent: Jul. 27, 2004

(54) METHOD AND APPARATUS FOR REMOVING A CHECKERBOARD-LIKE NOISE ARTIFACT FROM A CAPTURED COMPOSITE NTSC VIDEO FRAME

(75) Inventor: Gozde Bozdagi, Ankara (TR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/213,649

(22) Filed: Dec. 16, 1998

(51) Int. Cl.$^7$ .................................................. H04N 7/30
(52) U.S. Cl. ................... 348/615; 348/608; 348/398.1; 348/438.1; 382/275; 375/240.19
(58) Field of Search ............................ 348/615, 607, 348/608, 627, 398.1, 397.1, 437.1, 438.1, 400.1, 403.1, 408.1; 382/275, 276, 277, 281; 358/447; 375/240.19, 240.18

(56) References Cited

U.S. PATENT DOCUMENTS

| | | | | |
|---|---|---|---|---|
| 5,561,724 A | * | 10/1996 | Kido et al. ................. | 382/264 |
| 5,799,112 A | * | 8/1998 | Queiroz et al. .............. | 382/254 |
| 5,838,377 A | * | 11/1998 | Greene ........................ | 348/398 |
| 5,974,181 A | * | 10/1999 | Prieto .......................... | 382/232 |
| 6,208,951 B1 | * | 3/2001 | Kumar et al. ................ | 702/189 |
| 6,229,929 B1 | * | 5/2001 | Lynch et al. ................. | 382/268 |
| 6,272,253 B1 | * | 8/2001 | Bannon et al. .............. | 382/236 |
| 6,310,963 B1 | * | 10/2001 | Erdol et al. .................. | 382/103 |

* cited by examiner

Primary Examiner—Michael H. Lee
Assistant Examiner—Jean W. Désir
(74) Attorney, Agent, or Firm—Fay, Sharpe, Fagan, Minnich & McKee, LLP

(57) ABSTRACT

A wavelet domain filtering technique is disclosed that removes or at least minimizes checkerboard-like noise artifacts that result from capturing a composite NTSC video signal. A Haar basis filter bank is used to obtain a two-level wavelet decomposition. Low-pass filtering is performed on the high-high (HH) and the high-low (HL) bands of the wavelet decomposition since the checkerboard-like noise artifact is primarily visible on the vertical and the diagonal edges of the captured composite NTSC video frame.

23 Claims, 5 Drawing Sheets

$$\frac{Y(0,0) + Y(0,1)}{\sqrt{2}} \quad \frac{Y(0,2) + Y(0,3)}{\sqrt{2}} \rightarrow$$

$$\frac{Y(2,0) + Y(2,1)}{\sqrt{2}} \quad \frac{Y(2,2) + Y(2,3)}{\sqrt{2}} \rightarrow$$

$$\frac{Y(4,0) + Y(4,1)}{\sqrt{2}} \quad \frac{Y(4,2) + Y(4,3)}{\sqrt{2}} \rightarrow$$

$$\frac{Y(6,0) + Y(6,1)}{\sqrt{2}} \quad \frac{Y(6,2) + Y(6,3)}{\sqrt{2}} \rightarrow$$

$$\frac{Y(8,0) + Y(8,1)}{\sqrt{2}} \quad \frac{Y(8,2) + Y(8,3)}{\sqrt{2}} \rightarrow$$

$$\downarrow \qquad \downarrow$$

FIG. 5

$$\frac{\frac{Y(0,0)+Y(0,1)}{\sqrt{2}}+\frac{Y(2,0)+Y(2,1)}{\sqrt{2}}}{\sqrt{2}} \quad \frac{\frac{Y(0,2)+Y(0,3)}{\sqrt{2}}+\frac{Y(2,2)+Y(2,3)}{\sqrt{2}}}{\sqrt{2}} \rightarrow$$

$$\frac{\frac{Y(4,0)+Y(4,1)}{\sqrt{2}}+\frac{Y(6,0)+Y(6,1)}{\sqrt{2}}}{\sqrt{2}} \quad \frac{\frac{Y(4,2)+Y(4,3)}{\sqrt{2}}+\frac{Y(6,2)+Y(6,3)}{\sqrt{2}}}{\sqrt{2}} \rightarrow$$

$$\downarrow \qquad \downarrow$$

FIG. 6

$$\frac{\frac{Y(0,0)+Y(0,1)}{\sqrt{2}}-\frac{Y(2,0)+Y(2,1)}{\sqrt{2}}}{\sqrt{2}} \quad \frac{\frac{Y(0,2)+Y(0,3)}{\sqrt{2}}-\frac{Y(2,2)+Y(2,3)}{\sqrt{2}}}{\sqrt{2}} \rightarrow$$

$$\frac{\frac{Y(4,0)+Y(4,1)}{\sqrt{2}}-\frac{Y(6,0)+Y(6,1)}{\sqrt{2}}}{\sqrt{2}} \quad \frac{\frac{Y(4,2)+Y(4,3)}{\sqrt{2}}-\frac{Y(6,2)+Y(6,3)}{\sqrt{2}}}{\sqrt{2}} \rightarrow$$

$$\downarrow \qquad \downarrow$$

FIG. 7

$$\frac{Y(0,0) - Y(0,1)}{\sqrt{2}} \quad \frac{Y(0,2) - Y(0,3)}{\sqrt{2}} \rightarrow$$

$$\frac{Y(2,0) - Y(2,1)}{\sqrt{2}} \quad \frac{Y(2,2) - Y(2,3)}{\sqrt{2}} \rightarrow$$

$$\frac{Y(4,0) - Y(4,1)}{\sqrt{2}} \quad \frac{Y(4,2) - Y(4,3)}{\sqrt{2}} \rightarrow$$

$$\frac{Y(6,0) - Y(6,1)}{\sqrt{2}} \quad \frac{Y(6,2) - Y(6,3)}{\sqrt{2}} \rightarrow$$

$$\frac{Y(8,0) - Y(8,1)}{\sqrt{2}} \quad \frac{Y(8,2) - Y(8,3)}{\sqrt{2}} \rightarrow$$

$$\downarrow \qquad \downarrow$$

FIG. 8

$$\frac{\frac{Y(0,0) - Y(0,1)}{\sqrt{2}} + \frac{Y(2,0) - Y(2,1)}{\sqrt{2}}}{\sqrt{2}} \quad \frac{\frac{Y(0,2) - Y(0,3)}{\sqrt{2}} + \frac{Y(2,2) - Y(2,3)}{\sqrt{2}}}{\sqrt{2}} \rightarrow$$

$$\frac{\frac{Y(4,0) - Y(4,1)}{\sqrt{2}} + \frac{Y(6,0) - Y(6,1)}{\sqrt{2}}}{\sqrt{2}} \quad \frac{\frac{Y(4,2) - Y(4,3)}{\sqrt{2}} + \frac{Y(6,2) - Y(6,3)}{\sqrt{2}}}{\sqrt{2}} \rightarrow$$

$$\downarrow \qquad \downarrow$$

FIG. 9

$$\frac{\frac{Y(0,0) - Y(0,1)}{\sqrt{2}} - \frac{Y(2,0) - Y(2,1)}{\sqrt{2}}}{\sqrt{2}} \quad \frac{\frac{Y(0,2) - Y(0,3)}{\sqrt{2}} - \frac{Y(2,2) - Y(2,3)}{\sqrt{2}}}{\sqrt{2}} \rightarrow$$

$$\frac{\frac{Y(4,0) - Y(4,1)}{\sqrt{2}} - \frac{Y(6,0) - Y(6,1)}{\sqrt{2}}}{\sqrt{2}} \quad \frac{\frac{Y(4,2) - Y(4,3)}{\sqrt{2}} - \frac{Y(6,2) - Y(6,3)}{\sqrt{2}}}{\sqrt{2}} \rightarrow$$

$$\downarrow \qquad \downarrow$$

FIG. 10

METHOD AND APPARATUS FOR REMOVING A CHECKERBOARD-LIKE NOISE ARTIFACT FROM A CAPTURED COMPOSITE NTSC VIDEO FRAME

BACKGROUND OF THE INVENTION

The present invention relates to the video processing system art. It finds particular application in conjunction with a wavelet domain filtering technique, and more particularly a method and apparatus for removing a checkerboard-like noise artifact from a captured composite NTSC video frame. However, it should be appreciated that the present invention may also find application in conjunction with other types of video processing systems and applications that input composite NTSC video signals.

The NTSC video standard is used by the United States and Japan. This standard specifies a signal transmission at 525 lines/frame at 30 frames/second with a 2:1 interlace. The composite NTSC video signal can be represented as:

$$I(x,y,t)=Y(x,y,t)+I(x,y,t)\cos(2\pi f_s x+\Phi)\cos[\pi(f_t-f_l y)]Q(x,y,t)\sin(2\pi f_s x+\Phi)\cos[\pi(f_t-f_l y)],\quad \text{Eq.1}$$

where Y and (I, Q) are the luminance and the chrominance components, respectively; $f_s$ is the color subcarrier frequency; and $f_l$ an $f_r$ are the scan line and the frame frequencies, respectively.

Capturing still or freeze-frame pictures from a composite NTSC video signal for viewing on a progressive monitor, printing on a printer, inserting into an electronic document, etc. is a challenging problem in the area of video processing. Artifacts that may go unnoticed when looking at a moving video signal become extremely objectionable when viewing as a still picture.

In particular, when a composite NTSC video signal is captured, such as with a SUN Parallax video capture board, a checkerboard-like noise artifact can be observed on the vertical and diagonal edges in the captured video frame. The checkerboard-like artifact occurs in each of the interlaced fields ($F_1$, $F_2$) of the captured video frame. It is suggested that the checkerboard-like noise artifact may be a result of the quadrature demodulation and the corresponding chrominance shifts due to phase detection errors combined with the aliasing caused by the sampling of the color components during the process of A/D conversion.

Accordingly, it has been considered desirable to develop a new and improved method and apparatus for removing checkerboard-like noise artifact from a captured composite NTSC video frame that meets the above-stated needs and overcomes the foregoing difficulties and others while providing better and more advantageous results.

SUMMARY OF THE INVENTION

The present invention is directed to a wavelet domain filtering technique that removes or at least minimizes the checkerboard noise from a captured composite NTSC video frame. In the described embodiment, a Haar basis filter bank is used to obtain a wavelet decomposition. Low-pass filtering is performed on the high-high (HH) and the high-low (HL) bands since the checkerboard-like noise artifact is primarily visible on the vertical and the diagonal edges of the captured composite NTSC video frame.

In accordance with one aspect of the present invention, a method of processing a video frame captured from a moving video signal is disclosed. The method includes the steps of transforming the video frame into the wavelet domain to form a transformed video frame, filtering out noise artifacts present in the transformed video frame, and reconstructing the video frame from the transformed video frame to form a filtered video frame.

In accordance with another aspect of the present invention, an image processing apparatus is disclosed. The apparatus includes a frame grabber that generates a video-frame from a moving video signal, a first processor that transforms the video frame into the wavelet domain to form a decomposed video frame, a filter that removes noise artifacts present in the decomposed video frame, and a second processor that reconstructs the video frame from the decomposed video frame to form a filtered video frame.

One advantage of the present invention is the provision of a new method for removing a checkerboard-like noise artifact from a captured composite NTSC video frame without blurring the edges of images within the video frame.

Another advantage of the present invention is the provision of an improved method for removing a checkerboard-like noise artifact from a captured composite NTSC video frame without blurring the edges of images within the video frame.

Yet another advantage of the present invention is the provision of a new apparatus for removing a checkerboard-like noise artifact from a captured composite NTSC video frame without blurring the edges of images within the video frame.

Still another advantage of the present invention is the provision of an improved apparatus for removing a checkerboard-like noise artifact from a captured composite NTSC video frame without blurring the edges of images within the video frame.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

FIG. 5 illustrates a first-level decomposition wherein the first interlaced field of the video frame of FIG. 2 is low-pass filtered in a horizontal direction and down-sampled;

FIG. 6 illustrates a second-level decomposition wherein the first-level decomposition of FIG. 5 is low-pass filtered in a vertical direction and down-sampled to form a Low-Low (LL) band of the interlaced field;

FIG. 7 illustrates a second-level decomposition wherein the first-level decomposition of FIG. 5 is high-pass filtered in a vertical direction and down-sampled to form a Low-High (LH) band of the interlaced field;

FIG. 8 illustrates a first-level decomposition wherein the first interlaced field of the video frame of FIG. 2 is high-pass filtered in a horizontal direction and down-sampled;

FIG. 9 illustrates a second-level decomposition wherein the first-level decomposition of FIG. 8 is low-pass filtered in a vertical direction and down-sampled to form a High-Low (HL) band of the interlaced field; and FIG. 10 illustrates a second-level decomposition wherein the first-level decomposition of FIG. 8 is high-pass filtered in a vertical direction and down-sampled to form a High-High (HH) band of the interlaced field.

DETAILED DESCRIPTION OF THE PREFERRED EMBODIMENT(S)

Figure 1:
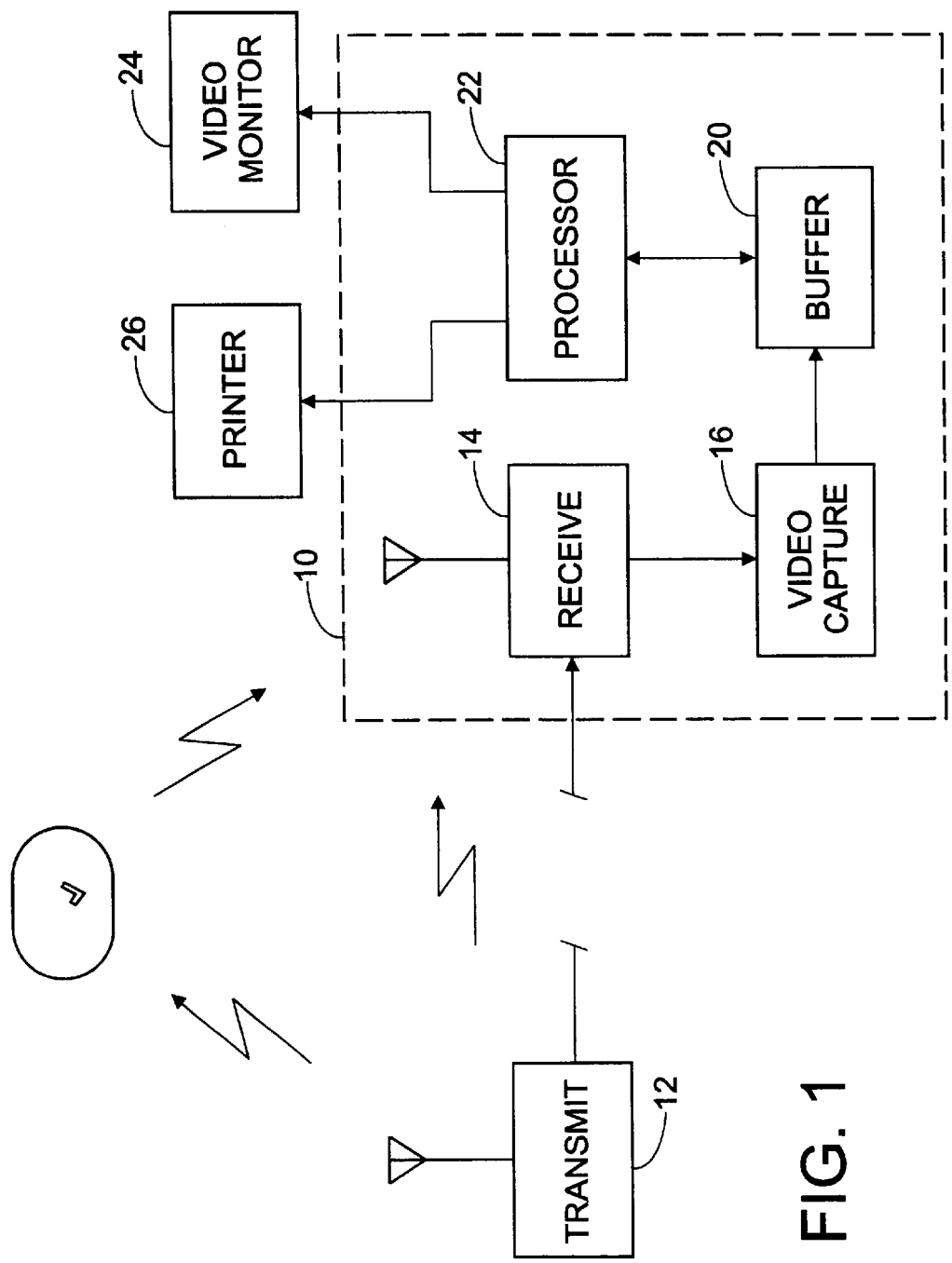
FIG. 1, is a simplified block diagram of an image processing system 10 that incorporates the features of the present invention therein.
Figure 2:
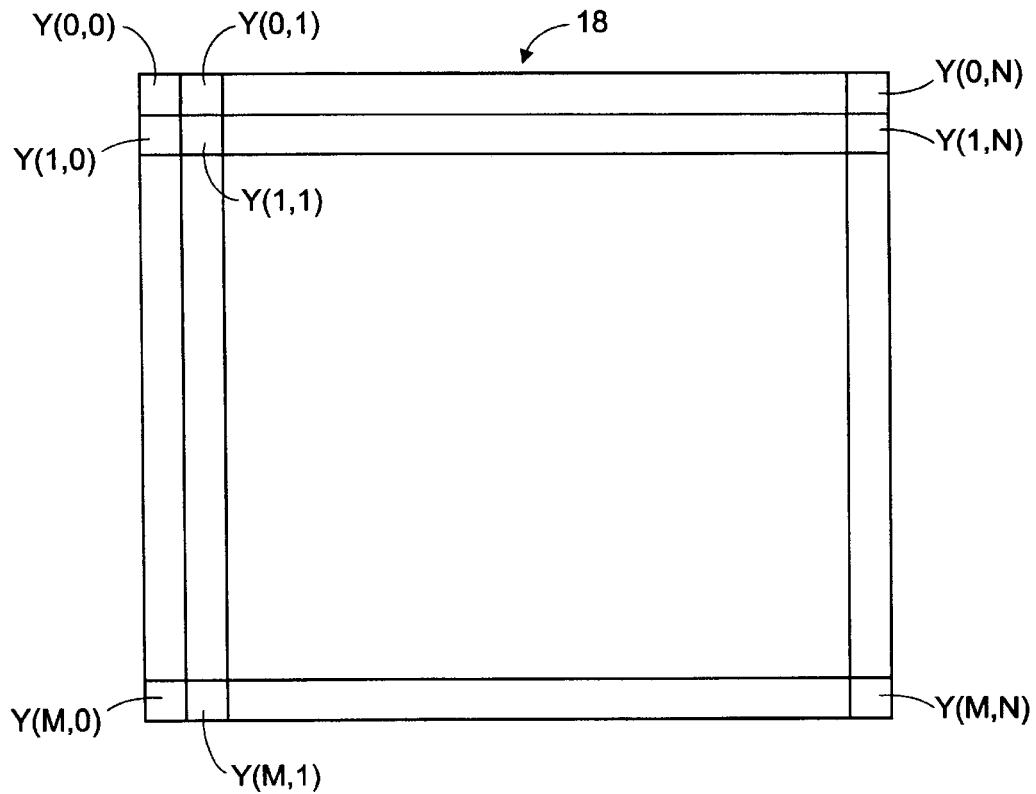
FIG. 2 is a pixelwise illustration of a captured progressive video frame having M number of scan lines divided into two interlaced fields, and N number of pixels per scan line.

Referring now to FIG. 1, there is shown a simplified block diagram of an image processing system 10 that incorporates the features of the present invention therein. A composite NTSC video signal is broadcast from a transmitter 12 via radio waves, cable, satellite, etc. A receiver 14 demodulates the NTSC video signal. A video capture or frame grabber device 16, such as a Parallax video capture board, acquires or generates a still or freeze-frame image of the moving NTSC video signal in a conventional manner. As shown in FIG. 2, the captured video frame can be represented as an array 18 of discrete picture elements or pixels having N number of pixels per M number of raster or scan lines.

Referring again to FIG. 1, the captured video frame 18 is stored in a buffer or other storage medium 20. A processor 22 accesses the buffer 20 for further processing of the video frame, such as displaying the video frame on a progressive monitor 24, printing the video frame on a printer 26, inserting the video frame into an electronic document, etc.

Referring now to FIG. 3, the captured video frame 18 includes two interlaced fields $F_1$ and $F_2$. Checkerboard-like noise artifacts, such as noise artifact 28, occur along the vertical and diagonal edges, such as diagonal edge 30, of an image within both fields $F_1$, $F_2$ of the video frame 18, as a result of the frame grabbing process. To facilitate describing the present invention, reference will be made only to the first interlaced field $F_1$ and the checkerboard-like noise artifact 28 occurring along the diagonal edge 30 therein. However, it should be appreciated that the noise artifact 28 and the edge 30 also occur in the second interlaced field $F_2$, and the present invention is equally effective in eliminating such noise artifacts occurring in either or both fields $F_1$, $F_2$.

Figures 3A, 3B:
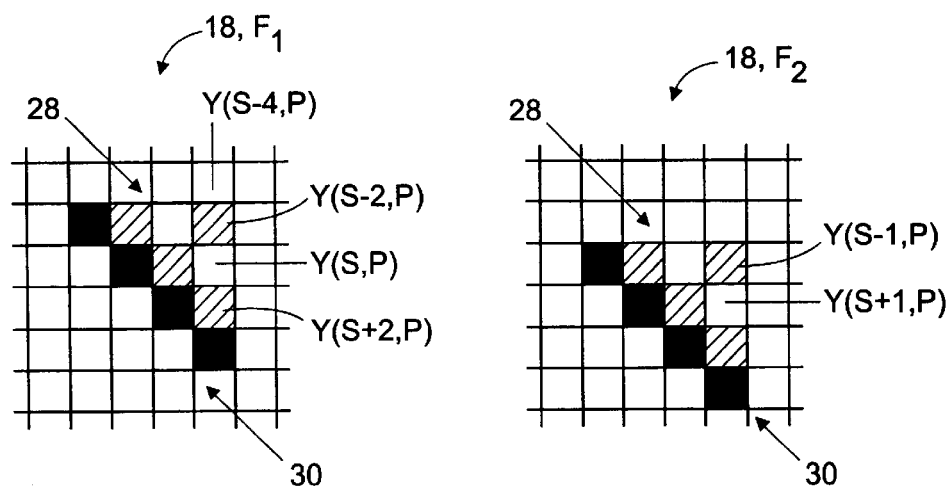
FIG. 3A illustrates a checkerboard-like noise artifact occurring in the first interlaced field $F_1$ of the video frame of FIG. 2.
FIG. 3B illustrates a checkerboard-like noise artifact occurring in the second interlaced field $F_2$ of the video frame of FIG. 2.

The checkerboard-like noise artifact 28 is characterized by an alternating intensity pattern of light and dark pixels from one scan line to the next scan line along a vertical or diagonal edge within a given field $F_1$, $F_2$ of the video frame. With reference to FIGS. 3A and 3B, Y(S, P) is the intensity Y (i.e. the luminance component) of the Pth pixel in the Sth scan line of video frame 18, where S<=M and P<=N. The intensity of a pixel (S−4, P), located four scan lines above pixel (S, P) in the same video frame 18 (or two scan lines above pixel (S, P) in the same field $F_1$), is nearly the same as the intensity of the pixel (S, P). Likewise the intensity of pixel (S−2, P) is nearly the same as the intensity of pixel (S+2, P). However, the pixels in consecutive scan lines in the field $F_1$, such as pixels (S, P) and (S−2, P), have very different intensity values. Note that the pixels associated with the noise artifact 28 are shaded only to distinguish them from the pixels associated with the edge 30.

Since the offending checkerboard-like noise artifact is mostly visible on the vertical and diagonal edges of the composite NTSC video freeze-frame, these edges should be detected before performing any noise removal steps. Edges are commonly located by computing a gradient vector of the image intensity at each pixel location. However, depending on how noisy the image is, the conventional gradient calculation can give erroneous results.

Figure 4:
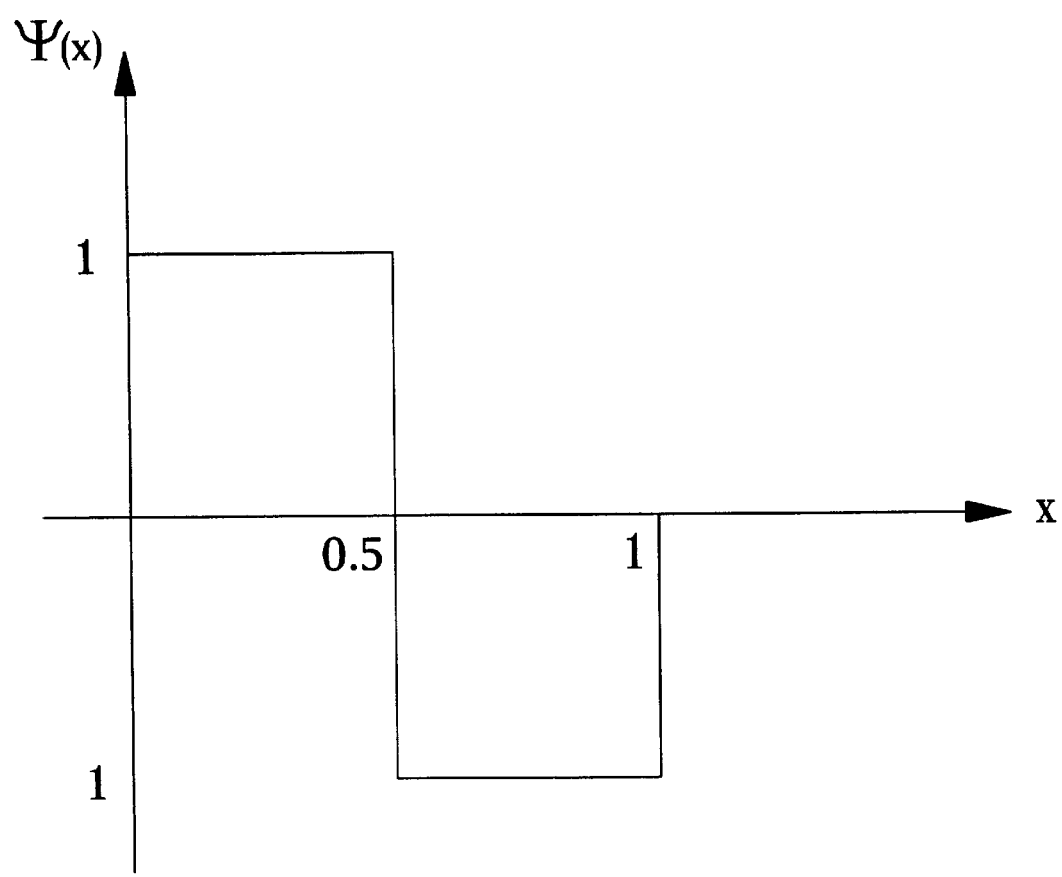
FIG. 4 illustrates a Haar basis wavelet function for localizing edges in the first interlaced field of the video frame of FIG. 2.

The present invention detects or localizes the vertical and diagonal edges within the video frame 18 by using a wavelet transform. In particular, the edges are detected from the local maxima of a wavelet transform modulus. Since the basis functions used in the wavelet transform vary from scale to scale, the wavelet transform is able to provide both a detailed frequency analysis and any signal discontinuities at the same time. The discrete wavelet transform of a 2-D function:

$$f(x,y)=u(x,y,t)|_{t=t_0} \qquad \text{Eq. 2}$$

is given by:

$$F(j, l) = 4^{-j} \sum_x \sum_y f(x, y)\psi(x2^{-j} - l)\psi(y2^{-j} - l), \qquad \text{Eq. 3}$$

where ψ(t) is the mother wavelet, and scaled and translated versions are the wavelet basis functions, also referred to as the baby wavelets. Several different families of wavelets are used in the literature. See for example: Y. T. Chan, Wavelet Basics, Kluwer Academic Pub., MA, 1995; and A. Graps, "An Introduction to Wavelets", *IEEE Computational Science and Engineering*, Summer 1995, pp. 50–61. The simplest example of a basis of wavelets is the Haar basis. The Haar basis of wavelets consists of piecewise constant functions as shown in FIG. 4. The Haar basis functions are advantageous because of their good localization in space domain and ease of implementation. For at least these reasons, the Haar basis of wavelets are believed most suitable for checkerboard noise removal.

The Haar basis transforms decompose the video frame 18 into average and difference components. Assuming for example, two adjacent pixels having the intensity values a and b, respectively. In the Haar basis transform, the average and difference values are defined as:

$$avg = \frac{(a+b)}{\sqrt{2}} \qquad \text{Eq. 4}$$

$$diff = \frac{(a-b)}{\sqrt{2}} \qquad \text{Eq. 5}$$

It should be appreciated that the intensity values a and b can be reconstructed from the average and difference values by using the Inverse Haar basis transform, where:

$$a = \frac{(avg + diff)}{\sqrt{2}} \qquad \text{Eq. 6}$$

$$b = \frac{(avg - diff)}{\sqrt{2}} \qquad \text{Eq. 7}$$

FIGS. 5–10 illustrate a two-level wavelet decomposition of the first interlaced field $F_1$ using the Haar basis functions. FIG. 5 illustrates a first-level decomposition wherein the first interlaced field $F_1$ is low-pass filtered in a horizontal (i.e. row) direction and down-sampled. In particular, the intensity values of adjacent pixels in each scan line of the field $F_1$ are averaged according to equation 4, where a is the intensity value of a first pixel and b is the intensity value of a second pixel adjacent to the first pixel in the same scan line.

FIG. 6 shows a second-level decomposition wherein the first-level decomposition of FIG. 5 is low-pass filtered (i.e. averaged) in a vertical (i.e. column) direction according to equation 4 and down sampled. That is, the values for two pixels similarly positioned along vertically adjacent scan lines of field $F_1$ are averaged according to equation 4. A Low-Low (LL) band of the first interlaced video field $F_1$ results from low-pass filtering and down sampling the first-level decomposition of FIG. 5.

FIG. 7 illustrates another second-level decomposition wherein the first-level decomposition of FIG. 5 is high-pass filtered in a vertical direction according to equation 5 and down sampled. That is, the difference between the values of two pixels similarly positioned along vertically adjacent scan lines of field $F_1$ is determined according to equation 5. A Low-High (LH) band of first interlaced field $F_1$ results from high-pass filtering and down sampling the first-level decomposition of FIG. 5.

FIG. 8 illustrates another first-level decomposition wherein first interlaced field $F_1$ is high-pass filtered in a horizontal direction and down sampled. In particular, a difference between the intensity values of adjacent pixels in each scan line of the first interlaced field $F_1$ is determined according to equation 5, where a is the intensity value of a first pixel and b is the intensity value of a second pixel adjacent to the first pixel in the same scan line.

FIG. 9 shows a second-level decomposition wherein the first-level decomposition of FIG. 8 is low-pass filtered (i.e. averaged) in a vertical direction according to equation 4 and down sampled. That is, the values of two pixels similarly positioned along vertically adjacent scan lines of the first interlaced field $F_1$ are averaged according to equation 4. A High-Low (HL) band of the first interlaced field $F_1$ results from low-pass filtering and down sampling the first-level decomposition of FIG. 8.

FIG. 10 illustrates another second-level decomposition wherein the first-level decomposition of FIG. 8 is high-pass filtered in a vertical direction according to equation 5 and down sampled. That is, the difference between the values of two pixels similarly positioned along vertically adjacent scan lines of the first interlaced field $F_1$ is determined according to equation 5. A High-High (HH) band of the first interlaced field $F_1$ results from high-pass filtering and down sampling the first-level decomposition of FIG. 8.

The processor 22 can be readily programmed and/or can include the necessary circuity for accessing the video frame 18 within the buffer 20, for parsing the video frame 18 in a bitwise row and column manner, and for implementing equations 4 and 5 to decompose the video frame 18 into the average and difference Haar basis components.

Thus, performing a two-level wavelet transform (i.e. decomposition) on the composite video frame 18 of FIG. 2 generates the four video bands, LL, LH, HL, and HH shown in FIGS. 6, 7, 9, and 10, respectively. The checkerboard-like noise artifact is mostly visible on the High-Low (HL) and the High-High (HH) bands, and is hardly noticeable on the low-low (LL) band. Accordingly, it is now possible to filter out the checkerboard-like noise artifact from only the video bands where the noise artifact is primarily present (i.e. the HL and HH bands).

In the embodiment being described, the HH and HL bands are bitwise parsed in a vertical direction to detect any checkerboard-like noise artifacts. If such a noise pattern is found, the corresponding pixel values can then be low-pass filtered to eliminate or at least minimize the noise pattern without blurring the edges within the video frame. More particularly, for a given pixel (P, S) within the HL band or the HH band of an interlaced field $F_1$, $F_2$, a checkerboard-like noise artifact can be detected and then low-pass filtered according to the following pseudo-code:

If $|Y(S, P)-Y(S-4, P)|<TH_1$, and $|Y(S+2, P)-Y(S-2, P)|<TH_1$, and $|Y(S, P)-Y(S-2, P)|<TH_2$, Then $Y_1(S, P)=((Y(S, P)+Y(S-2, P))/2$, where $TH_1$ and $TH_2$ are first and second threshold values; Y(S, P) is the intensity Y (i.e. the luminance component) of the Pth pixel in the Sth scan line of the HL band or the HH band of the interlaced field; Y(S−2, P) is the intensity Y of the Pth pixel located one scan line (S−2) above pixel (S, P) in the interlaced field; Y(S−4, P) is the intensity Y of the Pth pixel located two scan lines (S−4) above pixel (S, P) in the interlaced field; Y(S+2, P) is the intensity Y of the Pth pixel located one scan line (S+2) above pixel (S, P) in the interlaced field; and $Y_1$ is the low-pass filtered intensity value for the pixel (S, P) being processed.

The low-pass filtered intensity value $Y_1$ for the pixel (S, P) being processed is set equal to the average of the intensity values Y for the pixels (S, P) and (S−2, P). Mathematically, however, low-pass filtering the HH and HL bands corresponds to setting some of the wavelet coefficients to zero.

Assuming grey scale intensity values in the range of 0 to 255, a checkerboard-like noise artifact can be satisfactorily detected in the HL and HH video bands by setting the first threshold $TH_1$ to a value in the range of about 16 to about 48, and by setting the second threshold $TH_2$ to a value in the range of about 7 to about 10.

After the HL and HH bands of each interlaced field $F_1$, $F_2$, have been bitwise parsed to low-pass filter any checkerboard-like noise patterns that were detected, the composite video frame 18 can then be reconstructed from the LL, LH, HL and HH bands of each field $F_1$, $F_2$ according to equations 5 and 6. The reconstructed video frame can then be displayed on the progressive monitor 24, printed on the printer 26, inserted into an electronic document, etc. without the presence of checkerboard-like noise artifacts in the resulting image.

Although the present invention has been described in detail above, various modifications can be implemented without departing from the spirit of the present invention. For example, the image processing system 10 of the present invention can be readily implemented on or as a general purpose computer, a personal computer, a workstation, etc. Further, the image processing system 10 of the present invention can be readily implemented on an ASIC, thereby enabling the placement of the invention in an electronic subsystem, printer, display device, etc.

The present invention has been described with respect to a pixel intensity range of 0 to 255. However, it is contemplated by the present invention that the pixel intensity range can be any suitable range to describe the grey level of the pixel being processed. Furthermore, the present invention is readily applicable to any image processing system, not necessarily a binary output device.

Moreover, the present invention is readily applicable to a monochrome or black/white environment, and to a color environment. That is the term "grey level" has been used interchangeably to describe both black and white and color applications.

Having thus described the preferred embodiment(s), the invention is now claimed to be:

1. A method of processing a video frame captured from a moving video signal, comprising the steps of:
    transforming the video frame into the wavelet domain to form a transformed video frame;
    detecting the transformed video frame for checkerboard noise;
    low-pass filtering the transformed video frame where the checkerboard noise is detected; and
    reconstructing the video frame from the transformed video frame to form a filtered video frame.

2. The method of claim 1, wherein the moving video signal is a Composite NTSC video signal.

3. The method of claim 1, wherein the transforming step includes the step of:
    generating average and difference components of the video frame.

4. The method of claim 1, wherein the detecting includes determining that the checkerboard noise is present when:

$$|Y(S, P)-Y(S-4, P)|<TH_1;$$

$$|Y(S+2, P)-Y(S-2, P)|<TH_1; \text{ and,}$$

$$|Y(S, P)-Y(S-2, P)|<TH_2;$$

wherein $TH_1$ and $TH_2$ are first and second threshold values, Y(S, P) is the intensity Y of a Pth pixel in an Sth scan line of an interlaced field of the transformed video frame, Y(S−2, P) is the intensity Y of a Pth pixel located one scan line above pixel (S, P) in the interlaced field, Y(S−4, P) is the intensity Y of a Pth pixel located two scan lines above pixel (S, P),in the interlaced field, and Y(S+2, P) is the intensity Y of a Pth pixel located one scan line below pixel (S, P) in the interlaced field.

5. The method of claim 4, wherein the low-pass filtering assigns an intensity $Y_1$ to pixel (S, P) in accordance with:

$$Y_1(S, P)=((Y(S, P)+Y(S-2, P))/2.$$

6. The method of claim 1, wherein:
    the transforming step includes transforming the video frame into the wavelet domain using Haar basis functions; and
    the reconstructing step includes reconstructing the video frame from the transformed video frame using inverse Haar basis functions.

7. The method of claim 1, wherein:
    the video frame includes a first interlaced field and a second interlaced field,
    the transforming step includes the step of transforming the first and second interlaced fields into the wavelet domain to form first and second transformed fields, respectively,
    the filtering step includes the step of filtering out noise artifacts occurring in the first and second transformed fields, and
    the reconstructing step includes the step of reconstructing the video frame from the first and second transformed fields to form the filtered video frame.

8. The method of claim 1, further including the step of:
    downstream processing the filtered video frame.

9. The method of claim 8, wherein the downstream processing step includes at least one of the steps of:
    printing the filtered video frame on a printer,
    displaying the filtered video frame on a video monitor, and
    inserting the filtered video frame into an electronic document.

10. The method of claim 1, wherein said low-pass filtering is not applied to the transformed video frame where the checkerboard noise is not detected.

11. A method of processing a video frame captured from a moving video signal, comprising:
    transforming the video frame into the wavelet domain to form a transformed video frame, said transforming including executing a two-level wavelet decomposition to generate Low-Low, Low-High, High-Low, and High-High bands of the transformed video frame;
    filtering out noise artifacts present in the transformed video frame, said filtering being carried out in less than all the bands; and,
    reconstructing the video frame from the transformed video frame to form a filtered video frame.

12. The method of claim 11, wherein the filtering is carried out in only the High-Low and High-High bands.

13. An image processing apparatus comprising:
    a frame grabber that generates a video frame from a moving video signal;
    a first processor that transforms the video frame into the wavelet domain to form a decomposed video frame;
    a filter that removes noise artifacts present in the decomposed video frame, said filter detecting checkerboard-like noise artifacts occurring in the decomposed video frame and low-pass filtering decomposed video frame pixel values associated with the checkerboard-like noise artifact; and
    a second processor that reconstructs the video frame from the decomposed video frame to form a filtered video frame.

14. The apparatus of claim 13, wherein the moving video signal is a Composite NTSC video signal.

15. The apparatus of claim 13, wherein the first processor includes means for generating average and difference components of the video frame.

16. The apparatus of claim 13, wherein the filter determines that the checkerboard-like noise artifact is present when:

$$|Y(S, P)-Y(S-4, P)|<TH_1;$$

$$|Y(S+2, P)-Y(S-2, P)|<TH_1; \text{ and,}$$

$$|Y(S, P)-Y(S-2, P)|<TH_2;$$

wherein $TH_1$ and $TH_2$ are first and second threshold values, Y(S, P) is the intensity Y of a Pth pixel in an Sth scan line of an interlaced field of the transformed video frame, Y(S−2, P) is the intensity Y of a Pth pixel located one scan line above pixel (S, P) in the interlaced field, Y(S−4, P) is the intensity Y of a Pth pixel located two scan lines above pixel (S, P) in the interlaced field, and Y(S+2, P) is the intensity Y of a Pth pixel located one scan line below pixel (S, P) in the interlaced field.

17. The image processing apparatus of claim 13, wherein:
   the first processor transforms the video frame into the wavelet domain utilizing Haar basis functions; and
   the second processor reconstructs the video frame from the decomposed video frame utilizing inverse Haar basis functions.

18. The apparatus of claim 16, wherein the low-pass filtering conducted by the filter assigns an intensity $Y_1$ to pixel (S, P) in accordance with:

$$Y_1(S, P) = ((Y(S, P) + Y(S-2, P))/2.$$

19. The apparatus of claim 13, wherein the video frame includes a first interlaced field and a second interlaced field, the first processor transforms the first and second interlaced fields into first and second decomposed fields, respectively, the filter removes noise artifacts occurring in each of the first and second decomposed fields, and the second processor reconstructs the video frame from the first and second decomposed fields.

20. The apparatus of claim 13, further including at least one of a printer for printing the filtered video frame, a display monitor for displaying the filtered video frame, and means for inserting the filtered video frame into an electronic document.

21. The image processing apparatus of claim 13, wherein the filter does not perform filtering on decomposed video frame pixel values not associated with the checkerboard-like noise artifact.

22. An image processing apparatus comprising:
   a frame grabber that generates a video frame from a moving video signal;
   a first processor that transforms the video frame into the wavelet domain to form a decomposed video frame, said first processor including means for generating Low-Low, Low-High, High-Low, and High-high bands of the decomposed video frame;
   a filter that removes noise artifacts present in the decomposed video frame, said filter acting on less than all the bands; and,
   a second processor that reconstructs the video frame from the decomposed video frame to form a filtered video frame.

23. The apparatus of claim 22, wherein the filter acts on only the High-Low and High-High bands of the decomposed video frame.

* * * * *